Aug. 22, 1939.   C. STEGMEIER   2,170,736
GEAR SHIFTING MECHANISM
Filed Feb. 21, 1938
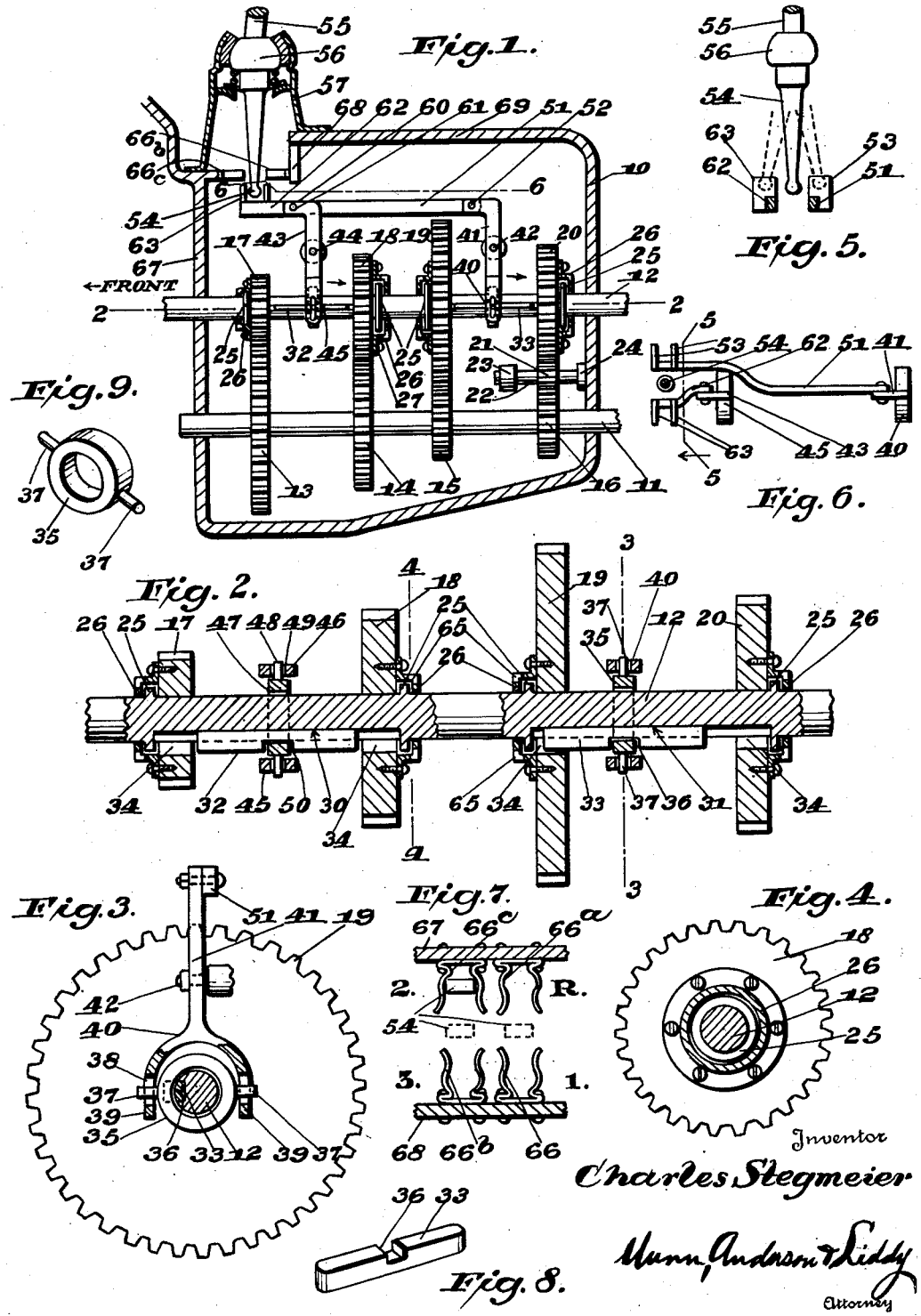

Patented Aug. 22, 1939

2,170,736

UNITED STATES PATENT OFFICE 2,170,736

GEAR-SHIFTING MECHANISM

Charles Stegmeier, Grimes, Calif.

Application February 21, 1938, Serial No. 191,821

1 Claim. (Cl. 74—473)

This invention relates to transmissions.

An object of the invention is the provision of a transmission in which loosely mounted gears on a countershaft are continually in mesh with gears fixed to a drive shaft, a shiftable means being employed for connecting the loosely mounted gears on the countershaft alternately with said countershaft and in a series which corresponds with the positions of the gear shift lever.

Another object of the invention is the provision of a transmission in which a plurality of gears fixed to a driving shaft continually drive a plurality of gears loosely mounted on a countershaft, the gears on the countershaft being provided with slots adapted to receive an end of a shiftable key slidably mounted in a keyway on the countershaft for locking the gears to the countershaft, thereby avoiding the usual clashing of the gears in well known forms when said gears are moved into mesh with each other.

A further object of the invention is the provision of a transmission in which gears fixed to a drive shaft mesh continually with loosely mounted gears on a countershaft, the countershaft being provided with keyways between the second and third speed gears and a keyway between the first and reversing speed gears with a key slidably mounted in each keyway whereby the keys are adapted to engage alternately slots in the adjacent gears for locking said gears to the countershaft, each key being provided with a slot which receives a ring slidable on the countershaft, means adapted to connect the rings with the inner projecting finger of the gear shift lever so that when the lever is shifted in a plurality of positions the various speeds of the automobile will be produced.

Another object of the invention is the provision of a transmission in which a plurality of gears are loosely mounted on a countershaft with these gears continually meshing with gears fixed to a drive shaft, the countershaft at spaced points being provided with collars and the loosely mounted gears having removable cup-shaped members engaging the collars between the gear and the inner face of the cup-shaped member for retaining the gears in position.

This invention will be best understood from a consideration of the following detailed description, in view of the accompanying drawing forming a part of the specification; nevertheless, it is to be understood that the invention is not confined to the disclosure, being susceptible of such changes and modifications as define no material departure from the salient features of the invention as expressed in the appended claim.

In the drawing:

Figure 1 is a vertical section of a transmission constructed in accordance with the principles of my invention, Figure 2 is a horizontal section through the countershaft taken along the line 2—2 of Fig. 1, Figure 3 is a vertical section taken along the line 3—3 of Figure 2, Figure 4 is a vertical section taken along the line 4—4 of Figure 2, Figure 5 is a vertical section taken along the line 5—5 of Figure 6, Figure 6 is a horizontal section taken along the line 6—6 of Figure 1, Figure 7 is a plan view of clips adapted to engage the projecting finger on the gear shift lever, Figure 8 is a view in perspective of a key employed for locking the loosely mounted gears to the countershaft, and Figure 9 is a view in perspective of a ring for shifting the keys.

Referring more particularly to the drawing, 10 designates a transmission housing in which is mounted a drive shaft 11 and a countershaft 12. The drive shaft is provided with a plurality of gears 13, 14, 15, and 16. These gears are fixed to the shaft and therefore are driven continually by the drive shaft.

The countershaft is provided with a plurality of loosely mounted gears 17, 18, 19 and 20. The gears 17 to 19, inclusive, mesh continually and respectively with gears 13, 14 and 15 of the shaft 11. The gear 20 meshes continually with an intermediate gear 21 rotatably mounted on a shaft 22 which is supported by bearings 23 and 24 carried by the walls of the housing 10. The gear 21 meshes continually with the gear 15 so that the gears 16, 21 and 20 provide a reverse rotation of the countershaft 12.

Gears 13 and 17 provide for high speed while gears 14, 18, 15 and 19, respectively, provide second and first speeds.

It will be noted that the countershaft 12 is provided with a plurality of collars 25 which are formed integrally with or may be connected to the countershaft 12. Each gear is provided with a cup-shaped member 26 having an annular flange 27 and these flanges are rigidly secured to the face of the gears 17 to 20, inclusive, and embrace the collars 25. The cup-shaped members 26 in connection with the collars 25 retain the gears 17 to 20, inclusive, in predetermined positions on the shaft 12 so that they are constantly in mesh with the gears 13, 14, 15 and 21, respectively.

The countershaft 12 is provided with a pair of keyways 30 and 31 in which are mounted respectively slidable keys 32 and 33. Each of the gears 17 to 20, inclusive, are provided with slots 34 which are adapted to receive one end of a key 32 or 33 as the case may be whereby the respective gears will be secured to the shaft 12 in an alternate relation. In other words, when one end of the key 33 is in engagement with a slot 34 of the gear 19, as shown in Fig. 2, the other end of the key is out of engagement with a similar slot 34 in the gear 20. The key 32 however is located in a neutral position with both of its ends free of the slots in the gears 17 and 18. Thus it will be seen that only one of the gears 17 to 20 is connected to that shaft 12 at one end.

A ring 35, shown in Figs. 3 and 9, is received by a notch 36 in the key 33 and the internal diameter of this ring is such that it neatly fits the shaft 12. The ring is provided with diametrically disposed pins 37 which are received by elongated slots 38 formed in the arms 39 of a yoke 40 which is carried by an arm 41 pivotally mounted at 42. A similar arm 43 is pivotally mounted at 44 and is provided with a yoke 45 which has arms 46 located upon opposite sides of a ring 47 which is slidably mounted on the shaft 12 between the gears 17 and 18. Pins 48 projecting diametrically from the ring 47 are received by elongated slots 49 in the arms 46 of the yoke 45. The ring 47 is received by a notch 50 formed in the key 32. The ring 47 and the yoke 45 are identical in construction with the ring 35 and the yoke 40.

A rod or rail 51 has one end pivotally connected at 52 to a right angular portion of the arm 41. This rail extends forwardly of the housing and is provided with a plurality of upstanding lugs 53 forming a fork to receive the lower end of a finger 54 depending from a gear shift lever 55. The gear shift lever 55 is supported by means of a ball and socket connection 56 with an auxiliary housing 57 carried by the top 69 of the main housing 10.

The arm 43 has a right angular portion 60 which is pivotally connected at 61 with a rod or rail 62 and this rail is provided with upstanding lugs 63 forming a fork between which is adapted to be received the finger 54.

The forward movement of the rail 51, as indicated by the arrow in Fig. 1, will cause a backward movement of the lower end of the arm 41. This is also true of the arm 43. A reverse movement of the rods 51 and 62 will likewise cause an opposite movement of the arms 41 and 43, respectively, from that which has just been previously described.

It will be noted that the cup-shaped members 26 are each provided with passages 65 through which lubricant is adapted to pass for lubricating the interior of said cup-shaped members and also the revolving shoulders 25 of the shaft 12.

A series of spring clips 66, 66a, 66b, 66c are located in a horizontal plane above the forks 53 and 63 and in such positions that they will receive the finger 54 when the gear shift lever 55 has been moved to one of the four positions for changing the speed of the vehicle. The spring clips 66 and 66a are connected to the front wall 67 of the housing 10 while clips 66b and 66c are connected to a partition 68 which depends from the top wall 69 of the housing.

The operation of my device is as follows:

When the gear shift lever is moved from its neutral position towards the left and then rearwardly said lever will be in the reverse speed. When this happens the finger 54 will have been rocked to the right, as shown in Fig. 5, so that it will be engaged by the fork 53 of the rail 51. When the lever 55 has been moved rearwardly the finger 54 will carry the forks and likewise the rail 51 forwardly of the housing 10 whereby the lower end of the arm 41 and likewise the fork 40 will have been moved rearwardly, as indicated by the arrow in Fig. 1. When the fork 40 is moved rearwardly, the ring 35 and likewise the key 33 will be moved rearwardly against the revolving gear 20 until the rear end of the key will align with the slot 34 in said gear so that the key 33 will enter the slot 34 and lock the gear 20 to shaft 12 for a reverse condition of the transmission. At this time the finger 54 is held in the reverse position by the strong spring clip 66a.

When the gear shift lever is moved to the neutral position and then forwardly the finger 54 will be moved rearwardly as will be the rail 51 whereby the fork 40 will be shifted forwardly, thus not only moving the key 33 out of the slot 34 of the gear 20 but the opposite end of the key will be moved into registry with the slot 34 in the gear 19 for low speed. In this position of the gear shift lever the finger 54 is held by the spring clip 66.

When the gear shift lever has again been restored to neutral position the key 33 will be in the position shown in Fig. 1. When the lever 55 is shifted to the right the finger 54 will be received by the fork 63 and rearward movement of the lever will cause forward shifting of the rod or rail 62 towards the front so that the key 32 will be received by the slot 34 in the gear 18. The finger 54 will be held by the clip 66c while the gear 18 will be locked to the shaft 12 so that the second or intermediate speed will be had. Shifting of the lever 55 from the intermediate speed to the neutral position and then forwardly will cause the clip 66b to hold the finger 54 in position while the rail 62 is shifted rearwardly for oscillating the arm 53 so that the fork 45 will be moved forwardly carrying with it the key 32 which will engage the slot 34 in the gear 17 for high speed.

It will be seen by this construction that the gears 17 to 20, inclusive, are in mesh with the respective gears associated on the shaft 11 at all times and the keys 32 and 33 act as clutches for locking the respective gears 17 to 20, inclusive, to the shaft 12 for determining the various speeds of the vehicle. This construction eliminates the clashing of the gears because of the continual meshing of the various gears on the shaft 12 with associated gears on the shaft 11.

The ring 35 is shown being formed of one piece but it will be appreciated that this ring may be formed in two sections for the application of the rings to the shaft 12 and likewise to the keys 32 and 33.

It will be noted that due to the pivoting of the arms 41 and 43 that the gear shift is of a type which was formerly used so that the shifting of the lever does not conform to the standard gear shift lever at the present time. However, the arms 41 and 43 may be formed rigidly with their respective rails 51 and 62 whereby the shifting of the lever will conform to the standard type of present gear shift levers.

The usual clutch which is actuated by the operator of the car may be done away with entirely where the motor is sufficiently powerful. However, the clutch may be employed when starting the car moving. During the normal running of the vehicle shifting may be accomplished by merely shifting the lever for obtaining the various higher speeds without actuating the clutch. When moving the shifting lever from one of the forward speeds to the rear speeds naturally the machine is stopped and the clutch may be used at this time. Instead of the usual gear shift lever one of the well known forms of operating mechanism for the shifting of the gears may be employed so that the space at the front seat may be free of the movable gear shift lever.

I claim:

In a transmission provided with a drive shaft having a plurality of gears fixed thereon and a countershaft having a plurality of gears loosely mounted thereon meshing with the adjacently disposed gears on the drive shaft and keyways between said gears, an operating means for connecting the loosely mounted gears to the countershaft comprising a pair of slidably mounted rails, means for reciprocating the rails, a pair of yokes pivotally mounted intermediate the ends, each yoke being associated with a rail and having an angular portion pivotally connected with said associated rail so that when a rail is reciprocated the connected yoke will be rocked, a key slidably mounted on each keyway and provided with a transverse notch, a pair of rings on the countershaft, each ring being received in a slot in a key and located beneath a yoke, the gears on the countershaft having a notch adapted to receive the adjacently disposed end of a key and means connecting each ring with its associated yoke.

CHARLES STEGMEIER.